United States Patent Office 2,759,822
Patented Aug. 21, 1956

2,759,822
X-RAY FILM

Jean E. Jones, Frederick H. Reed, and John A. Kuniskis, Rochester, N. Y., assignors to Eastman Kodak Company, Rochester, N. Y., a corporation of New Jersey No Drawing. Application June 4, 1952,
Serial No. 291,802

2 Claims. (Cl. 95—8)

This invention relates to novel photographic elements which are useful for obtaining X-ray photographs or radiograms, and to a method for processing such elements.

The desensitization of certain film coatings by strains produced in large sheets by improper handling so as to produce kink marking is well-known. The problem is particularly troublesome in high-speed negative silver-bromiodide emulsions, such as those used in X-ray diagnosis. Since such emulsions are considerably thicker than those customarily employed in photography, the tendency toward kink marking is quite enhanced. Moreover, the tendency to show such desensitization becomes much worse in many instances after the coated film has been edged.

We have now found that the addition of certain polymethine dyes, many of which are useful in optically sensitizing photographic silver halide emulsions, can be used to effectively reduce the tendency toward kink desensitization in certain film coatings. Some poylmethine dyes which have a small desensitizing effect (i. e. not over 25 per cent) can also be used to produce the novel effects of our invention. Although many of the polymethine dyes useful in practicing our invention have a maximum sensitivity lying outside the range of spectral distribution of the fluorescent or intensifying screens used in X-ray photography, yet they are none the less effective in providing the novel results of our invention. Moreover, not all polymethine dyes which are useful in optically sensitizing photographic silver halide emulsions can advantageously be used in our invention. It is thus apparent that the phenomena provided by our invention were quite unexpected.

It is, therefore, an object of our invention to provide novel photographic elements adapted for use in X-ray photography. A further object is to provide a means of preparing such elements. Still another object is to provide a means of processing such photographic elements. Other objects will become apparent from a consideration of the following description and examples.

Photographic elements used in X-ray photography generally comprise a base support having superimposed on each side of the support a photosensitive layer. Such elements generally have a protective layer coated over each emulsion layer, the protective layers containing a nondiffusing, light-absorbing material (see Murray U. S. Patent 2,379,373, issued June 26, 1945). The photosensitive layers customarily employed in such elements have a thickness of from about 0.4 to 1.2 mils, and are generally high speed, negative silver bromiodide emulsions. Other silver halide emulsions, such as silver chlorobromiodide emulsions can be used, if desired.

The polymethine dyes useful in practicing our invention comprise certain cyanine, carbocyanine, hemicarbocyanine, merocyanine, complex (trinuclear) merocyanine, and hemioxonol dyes.

The cyanine dyes useful in practicing our invention can advantageously be represented by the following general formula:

I.
$$R-N\underset{\underset{X}{|}}{\overset{Z}{\diagup\diagdown}}C=CH-C\overset{Z_1}{\diagup\diagdown}N-R_1$$

wherein R and $R_1$ each represents an alkyl group, preferably a long chain alkyl group, such as an alkyl group containing at least nine carbon atoms, e. g. n-nonyl, n-decyl, n-dodecyl (lauryl), n-hexadecyl (cetyl), etc., X represents an acid radical, such as bromide, chloride, iodide, ethylsulfate, p-toluenesulfonate, perchlorate, etc. and Z and $Z_1$ each represents the non-metallic atoms necessary to complete a heterocyclic nucleus of the benzoxazole series.

The carbocyanine dyes useful in practicing our invention can advantageously be represented by the following general formula:

II.
$$R_2-N\overset{Z_2}{\diagup\diagdown}C=CH-\overset{R_4}{\underset{|}{C}}=CH-C\overset{Z_3}{\diagup\diagdown}\underset{\underset{X_1}{|}}{N}-R_3$$

wherein $R_2$ and $R_3$ each represents an alkyl group, such as methyl, ethyl, n-butyl, n-amyl, β-hydroxyethyl, etc., $R_4$ represents a hydrogen atom or an alkyl group, such as methyl, ethyl, etc., $X_1$ represents an acid radical, such as bromide, chloride, iodide, perchlorate, ethylsulfate, p-toluenesulfonate, etc., and $Z_2$ and $Z_3$ each represents the non-metallic atoms necessary to complete a heterocyclic nucleus, such as thiazole, benzothiazole, benzoselenazole, benzoxazole, α-naphthothiazole, β-naphthothiazole, etc. Dyes of the type represented by Formula II can advantageously be prepared according to the methods described in Brooker U. S. Patent 1,934,658, issued November 7, 1933; Brooker U. S. Patent 1,939,201, issued December 12, 1933; White U. S. Patent 1,990,681, issued February 12, 1935; Brooker U. S. Patent 1,994,563, issued November 19, 1935; and British Patent (Kodak) 538,857, accepted August 19, 1941.

The hemicarbocyanine dyes useful in practicing our invention can advantageously be represented by the following general formula:

III.
$$R_5-N\underset{\underset{X_2}{|}}{\overset{Z_4}{\diagup\diagdown}}C-CH=CH-N\overset{R_6}{\diagdown R_7}$$

wherein $R_5$ and $R_6$ each represents an alkyl group, such as methyl, ethyl, n-butyl, n-heptyl, n-nonyl, n-decyl, n-dodecyl (lauryl), n-hexadecyl (cetyl), etc., at least $R_5$ or $R_6$ being an alkyl group of at least nine carbon atoms $R_7$ represents a hydrogen atom or an alkyl group, such as methyl, ethyl, n-butyl, n-heptyl, n-nonyl, n-decyl, n-dodecyl (lauryl), n-hexadecyl (cetyl), etc., and $R_6$ and $R_7$ together represent an alkylene group such as pentamethylene, etc., $X_2$ represents an acid radical, such as bromide, chloride, iodide, ethylsulfate, p-toluenesulfonate, perchlorate, etc., and $Z_4$ represents the non-metallic atoms necessary to complete a heterocyclic nucleus of the benzothiazole series. Certain of the hemicarbocyanine dyes represented by Formula III above can be prepared according to the method described in White and Keyes U. S. Patent 2,263,749, issued November 25, 1941.

Merocyanine dyes which can be used in practicing our invention can advantageously be represented by the following general formula:

IV.
$$R_8-N\overset{Z_5}{\diagup\diagdown}C(=CH-\overset{R_9}{\underset{|}{C}})_{n-1}=C\overset{Q}{\diagup\diagdown}C=O$$

wherein $R_8$ represents an alkyl group, such as methyl, ethyl, n-propyl, n-butyl, β-hydroxyethyl, etc., $R_9$ represents a hydrogen atom or an alkyl group, such as methyl, ethyl, etc., $n$ represents a positive integer of from 1 to 2, $Z_5$ represents the non-metallic atoms necessary to complete a heterocyclic nucleus, such as benzothiazole, benzoxazole, α-naphthothiazole, β-naphthothiazole, etc., and Q represents the non-metallic atoms necessary to complete a heterocyclic nucelus such as rhodanine, 4(5)-thiazolone, thiohydantoin, selenohydantoin, 2-thio-2,4(3,5)-oxazoledione, 2-seleno-2,4(3,5)-thiazoledione, etc. Such dyes have previously been described in Brooker U. S. Patent 2,177,402, issued October 24, 1939; Brooker U. S. Patent 2,177,403, issued October 24, 1939; Brooker and White U. S. Patent 2,263,757, issued November 25, 1941; Brooker U. S. Patent 2,282,116, issued May 5, 1942; and Brooker and Sprague U. S. Patent 2,332,433, issued October 19, 1943.

The complex merocyanine dyes useful in practicing our invention can advantageously be represented by the following general formula:

V.

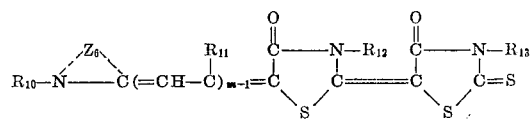

wherein $R_{10}$, $R_{12}$, and $R_{13}$ each represents an alkyl group, such as methyl, ethyl, β-hydroxyethyl, carbethoxymethyl, β-methoxyethyl, etc., $R_{11}$ represents a hydrogen atom or an alkyl group, such as methyl, ethyl, etc., $m$ represents a positive integer of from 1 to 2, and $Z_6$ represents the non-metallic atoms necessary to complete a heterocyclic nucleus, such as benzothiazole, benzoselenazole, α-naphthothiazole, β-naphthothiazole, etc. The dyes of Formula V can be prepared according to the methods described in Fry and Kendall U. S. Patent 2,388,963, issued November 13, 1945; Brooker U. S. Patent 2,454,629, issued November 23, 1948; and Van Zandt and Brooker U. S. Patent 2,485,679, issued October 25, 1949.

The hemioxonol dyes useful in practicing our invention can advantageously be represented by the following general formula:

VI.

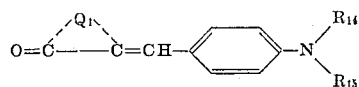

and

VII.

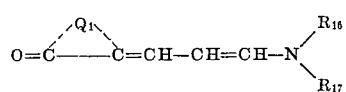

wherein $R_{14}$ and $R_{15}$ each represents an alkyl group, such as methyl, ethyl, n-propyl, etc., $R_{16}$ represents an acyl group, such as acetyl, propionyl, etc., $R_{17}$ represents an aryl group, such as phenyl, p-tolyl, etc., and $Q_1$ represents the non-metallic atoms necessary to complete a heterocyclic nucleus of the rhodanine series. The dyes of Formulas VI and VII can be prepared according to the methods described in Brooker U. S. Patents 2,089,729, issued August 10, 1937, and 2,165,339, issued July 11, 1939.

The optimum concentration of polymethine dye can be determined by making the ordinary observations customarily applied in emulsion making. The amount, of course, will vary from dye to dye and emulsion to emulsion. In general, from 2 to 125 mg. of dye per mole of silver halide can advantageously be employed. The polymethine dyes can be incorporated in the emulsions by any of the means usually employed in the art. For example, a stock solution can be prepared by dissolving the dye in a suitable solvent, such as methanol, acetone, pyridine, etc. Then into one liter of a flowable photographic gelatino-silver-halide emulsion an amount of the stock solution (diluted somewhat, if desired) is incorporated. The emulsion containing the polymethine dye is then coated on a suitable support, such as a cellulose derivative (e. g. acetate, nitrate, acetate butyrate, etc.), synthetic resin, such as polyvinyl acetate, polyvinyl acetal, etc., and allowed to dry, details of these processes being well-known to those skilled in the art of photography. Advantageously, the emulsion is applied to both sides of the support and has a thickness not less than about 0.4 mils. For testing the efficiency of a particular polymethine dye, a single layer emulsion is sufficient.

In most cases the effect is readily visible in the fresh film coating, but in many cases the best effect is obtained only after the film has been aged artificially at 120° F. at 45 per cent relative humidity for 3 days or longer. In some instances, there is even some apparent improvement after aging, the reasons for which have not been fully investigated.

The anti-kink marking effect is best observed by means of a triangle and sensitometric bend test. The triangle test involves compression of the film coating between two plates, one of which has a raised triangle and the other of which has a triangle of about three times the area of the first cut in it. The raised triangle is an isosceles triangle, the longer sides being about 9/16" in length, the shorter side being about 7/16" in length. The offset of the raised triangle is about 1/16" and the proportions of the depressed triangle are the same as those of the raised triangle. For testing purposes, a 3 kg. weight is applied to the top of the raised triangle. The sensitometric bend test involves bending a strip of the film through an angle of about 90° (the radium of curvature being about 3/64" in most instances), the radius of curvature being great enough so that the film in strip form, is not creased. The film after kinking is then given either a uniform flash or is exposed in a Ib sensitometer, and developed, fixed, washed and dried in the usual manner. The spectral distribution of the light source is adjusted by means of a filter to be almost identical with that emitted by a standard fluorescent screen, such as is customarily employed in X-ray photography. Of course, when using the sensitometric bend test, the bending is done longitudinally, so that each step in the exposure by the simulated X-ray screen is crossed by the line of kinking. The results of the triangle and sensitometric bend test parallel each other generally. In some instances the film was aged at 120° F. at 45 percent relative humidity for 3 days before kinking, and the results of these tests are given in the tables below in the columns headed "ΔD after 3 days/120° F./45% RH."

The effectiveness of a particular polymethine dye can be observed by visual comparison between the density of the unaffected and kinked portions of the film, or by making actual density measurements. When using the sensitometric bend test, numerical data were obtained by a microdensitometer trace of the sensitometric step whose gross density was closest to 0.5. The difference in density between the normal density of the step and the minimum density in the kinked portion was measured. The difference is designated ΔD in the tables which follow.

Representative cyanine (monomethine) dyes which can be used in our invention comprise the following:

1. 3,3'-dilauryloxacyanine perchlorate.
2. 3,3'-dicetyloxacyanine iodide.

Representative carbocyanine dyes which can be used in our invention comprise the following:

3. 3,3'- diethyl - 4,4',7 - trimethylthiazolocarbocyanine iodide.
4. 3,3'-diethylthiacarbocyanine iodide.
5. 3,3'-diethyl-9-methylthiacarbocyanine iodide.
6. 3,3',9-triethylthiacarbocyanine iodide.

7. 3,3'-diethyl-4,5,4',5'-dibenzothiacarbocyanine iodide.
8. 3,3',9 - trimethyl - 4,5,4',5'- dibenzothiacarbocyanine iodide.
9. 3,3'-diethyl-9-methyl-4,5,4',5'-dibenzothiacarbocyanine iodide.
10. 9-ethyl - 3,3'- dimethyl - 4,5,4',5'- dibenzothiacarbocyanine iodide.
11. 3,3'-diethylselenacarbocyanine iodide.
12. 3,3'-diethyl-9-methylselenacarbocyanine iodide.
13. 3,3'-diethyl-4'-methylthiathiazolocarbocyanine iodide.
14. 3,3'-diethyl-4'-methyloxathiazolocarbocyanine iodide.

Representative merocyanine dyes which can be used in our invention comprise the following:

15. 3-ethyl-5-[(3-ethyl - 2(3)-benzothiazolylidene)isopropylidene]rhodanine.
16. 3-ethyl-5-[(3-ethyl - 2(3)-benzothiazolylidene)isopropylidene]-2-thio-2,4(3,5)-oxazoledione.
17. 5-[(3-ethyl-2(3)-benzoxazolylidene)ethylidene]-3-n-heptyl-1-phenyl-2-thiohydantoin.
18. 5 - [(3-ethyl - 2(3)-benzoxazolylidene)ethylidene]-3-ethyl-1-phenyl-2-thiohydantoin.
19. 5 - [(3 - ethyl-2(3)-benzoxazolylidene)ethylidene]-3-ethyl-1-phenyl-2-selenohydantoin.
20. 3 - ethyl - 5[(3 - ethyl-2(3)-benzoxazolylidene)ethylidene]-2-seleno-2,4(3,5)-thiazoledione.
21. 5-[(3-ethyl-2(3)-α-naphthoxazolylidene)ethylidene]-3-n-heptyl-1-phenyl-2-thiohydantoin.
22. 5 - (3 - ethyl-2(3)-benzothiazolylidene)-3-ethyl-2-seleno-2,4(3,5)-thiazoledione.
23. 5 - (3 - ethyl - 2(3)-benzothiazolylidene)-2-diphenylamino-4(5)-thiazolone.

Representative complex merocyanine dyes which can be used in our invention comprise the following:

24. 5 - [(3-ethyl-2(3)-benzothiazolylidene)-α-ethylethylidene] - 3 - β-methoxyethyl-2-(3-β-methoxyethyl-4-oxo-2-thiono-5-thiazolidylidene)-4-thiazolidone.
25. 3-ethyl-5-[(3-ethyl-2(3)-benzoselenazolylidene)ethylidene] - 2-(3-ethyl-4-oxo-2-thiono-5-thiazolidylidene)-4-thiazolidone.
26. 2 - (3-carbethoxymethyl-4-oxo-2-thiono-5-thiazolidylidene) - 3-ethyl-5-[(3-ethyl-2(3)-benzothiazolylidene)-α-ethylethylidene]-4-thiazolidone.
26a. 2 - (3 - carbethoxymethyl-4-oxo-2-thiono-5-thiazolidylidene)-3-ethyl-5-[(1-ethyl-2(1)-β-naphthothiazolylidene)-α-ethylethylidene]-4-thiazolidone.
27. 3 - ethyl - 5-(3-ethyl-2(3)-benzothiazolylidene)-2-(3-ethyl-4-oxo-2-thiono-5-thiazolidylidene) -4-thiazolidone.

Representative hemicarbocyanine dyes which can be used in our invention comprise the following:

28. 3 - ethyl-2-(β-n-laurylaminovinyl)benzothiazolium iodide.
29. 3 - n - lauryl-2[β-(4-piperidyl)vinyl]benzothiazolium perchlorate.
30. 3 - ethyl-2-(β-n-nonylaminovinyl)benzothiazolium iodide.
31. 2 - (β-n-cetylaminovinyl)-3-ethylbenzothiazolium iodide.

Representative hemioxonol dyes which can be used in our invention comprise the following:

32. 5-(p-dimethylaminobenzal)-3-ethylrhodanine.
32a. 5-(p-dimethylaminobenzal)rhodanine.
33. 5-(p-diethylaminobenzal)-3-ethylrhodanine.
34. 5-(γ-acetanilidoallylidene)-3-ethylrhodanine.

In the manner described above, various polymethine dyes were dissolved in a suitable solvent and the solutions added to gelatino-silver-bromiodide emulsions. After a short after-ripening, the emulsions were coated on a cellulose acetate support and dried. The anti-kink marking effect of the various dyes was tested by either of the methods described above. The amount of dye per mol. of silver halide and results are given in the tables below. The $\Delta D$ given in some of the tables is a micro-densitometer measurement of the difference between normal density and minimum density in the kinked portion where gross normal density is nearest 0.5. The exposures in each instance were made with light filtered in such a manner as to give a spectrum almost identical to that emitted by an X-ray screen. The results are given in the tables which follow:

A. CARBOCYANINE DYES

TABLE I.—SENSITOMETRIC BEND KINK TESTING

| Dye No. | Amount, g/mol. | $\Delta D$ | $\Delta D$ after 3 days/120° F./ 45% R. H. |
|---|---|---|---|
| Blank | 0 | .10 | .14 |
| 12 | 0.1 | .04 | .04 |
| 12 | 0.05 | .07 | .07 |
| 12 | 0.025 | .08 | .09 |
| 9 | 0.1 | .03 | .00 |
| 9 | 0.5 | .04 | .05 |
| 9 | 0.025 | .05 | .09 |
| 9 | 0.01 | .05 | .06 |
| 14 | 0.08 | .06 | .09 |
| 14 | 0.04 | .08 | .12 |
| 14 | 0.02 | .09 | .14 |
| 5 | 0.10 | .00 | .00 |
| 5 | 0.05 | .03 | .04 |
| 5 | 0.025 | .06 | .05 |
| 10 | 0.10 | .05 | .03 |

The improvement provided according to our invention can readily be seen from the above table. The various dyes vary in effectiveness and in the amount necessary to produce the desired effect.

B. CYANINE DYES

The results given in the table below were recorded from visual observations, and not from densitometer measurements. The effects were rated on the basis of 0 for no kinking, 1 for very slight kinking, 2 for some kinking, 3 for some improvement, and 4 for no improvement.

TABLE II.—TRIANGLE BEND KINK TESTING

| Dye No. | Amount, g./mol. | Residual Kink [1] |
|---|---|---|
| 1 | 0.04 | 0 |
| 2 | 0.02 | 2 |
| 2 | 0.04 | 1 |

[1] After three days at 120° F., 45% R. H.

C. HEMICARBOCYANINE DYES

The results given in the table below were derived in the same manner as those given in Table II above.

TABLE III.—TRIANGLE BEND KINK TESTING

| Dye No. | Amount, g./mol. | Residual Kink [1] |
|---|---|---|
| 30 | 0.01 | 2 |
| 30 | 0.02 | 1 |
| 28 | 0.01 | 2 |
| 28 | 0.02 | 1 |
| 31 | 0.01 | 1 |
| 31 | 0.02 | 0 |
| 35 | 0.01 | 4 |
| 35 | 0.02 | 4 |
| 36 | 0.01 | 4 |
| 36 | 0.02 | 4 |

[1] After three days at 120° F., 45% R. H.

Dye 35 is 2-(β-cyclohexylaminovinyl)-3-ethylbenzothiazolium iodide while dye 36 is 3-ethyl-2-(β-n-heptylaminovinyl) benzothiazolium iodide. The above table clearly shows that not all hemicarbocyanine dyes are effective in our invention.

D. MEROCYANINE DYES

The results given in the table below were derived in the same manner as those given in Table I above.

TABLE IV.—SENSITOMETRIC BEND KINK TESTING

| Dye No. | Amount, g/mol. | ΔD | ΔD after 3 days/120° F./ 45% R. H. |
| --- | --- | --- | --- |
| Blank | 0 | .11 | .16 |
| 16 | 0.05 | .00 | .03 |
| 16 | 0.025 | .04 | .08 |
| 17 | 0.05 | .03 | .03 |
| 17 | 0.025 | .04 | .03 |
| 17 | 0.125 | .03 | .04 |
| 18 | 0.1 | .00 | .00 |
| 18 | 0.05 | .04 | .04 |
| 18 | 0.025 | .04 | .07 |
| 21 | 0.1 | .00 | .03 |
| 21 | 0.05 | .04 | .03 |
| 21 | 0.025 | .03 | .04 |
| 15 | 0.04 | .00 | |

E. COMPLEX MEROCYANINE DYES

The results given in the table below were derived in the same manner as those given in Table II above.

TABLE V.—TRIANGLE BEND KINK TESTING

| Dye No. | Amount, g./mol. | Residual Kink [1] |
| --- | --- | --- |
| 24 | 0.025 | [2] 1 |
| 24 | 0.006 | [2] 2 |
| 25 | 0.02 | 4 |
| 25 | 0.04 | 0 |
| 26 | 0.02 | 1 |
| 26 | 0.04 | 0 |
| 26a | 0.02 | 1 |
| 26a | 0.04 | 0 |
| 27 | 0.05 | 4 |
| 27 | 0.1 | 3 |

[1] After three days at 120° F., 45% R. H.
[2] Very slight change after 3 days at 120° F. at 45% R. H. (a sensitometric bend kink test showed: for 0.025 conc., ΔD was 0.03 and 0.04 after 3 days at 120° F. at 45% R. H., for 0.006, ΔD was 0.05 and 0.03 after 3 days at 120° F. at 45% R. H.).

F. HEMIOXONOL DYES

The results given in the table below were derived in the same manner as those given in Table II above.

TABLE VI.—TRIANGLE BEND KINK TESTING

| Dye No. | Amount, g./mol. | Residual Kink [1] |
| --- | --- | --- |
| 32a | 0.02 | 1 |
| 32 | 0.005 | 0 |
| 34 | 0.1 | 0 |

[1] After three days at 120° F., 45% R. H.

The dye numbers given in the above tables correspond to those given above where the specific names of the dyes are given.

The following table gives the optimum ranges of certain dyes not given in the above tables. The amounts given are not restrictive, but are representative of the most efficacious ranges as determined by actual test.

TABLE VII

| Dye No. | Range of g./mol. |
| --- | --- |
| 3 | 0.10 |
| 4 | 0.10 |
| 5 | 0.05 to 0.10 |
| 6 | 0.05 to 0.10 |
| 7 | 0.05 to 0.10 |
| 8 | 0.05 to 0.10 |
| 19 | 0.10 |
| 20 | 0.10 |
| 22 | 0.10 |
| 23 | 0.10 |
| 29 | 0.005 to 0.02 |

In addition to being provided with a light-sensitive layer on either side of the support, the novel X-ray sensitive, photographic elements of our invention can have subbing layers, such as antihalation layers, intermediate between the support and the light-sensitive emulsions, and overcoating layers, which permit handling of the elements in daylight without fogging, such for example, as is described in U. S. Patent 2,379,373 mentioned above. For example, a gelatin overcoat containing dispersed carbon can be used. Alternatively, the protective light-dispersing layers can consist of a dispersion of finely divided carbon in a mixture of colloids, such as gelatin and casein, or gelatin and a synthetic resin, e. g. a polyvinyl acetal, etc. The same type of polymethine dye need not be incorporated in each emulsion layer, but a different type of polymethine dye can be incorporated in each emulsion layer.

Anti-kinking agent 1 used above was prepared as follows:

*Example A.—3,3'-Di-n-lauryloxacyanine perchlorate*

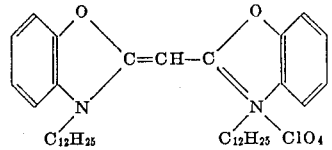

A suspension of 150 g. (2 mols.) of 2-methylbenzoxazole lauriodide (obtained by heating together 2-methylbenzoxazole and lauryl iodide) in 100 ml. of acetic anhydride was heated to the boiling point in a 1-liter, 3-necked flask equipped with a mechanical stirrer, reflux condenser and dropping funnel. The flame was removed and 41.2 g. (1 mol. plus 100% excess) of isoamyl nitrite was added slowly from the dropping funnel as the mixture was well stirred. After chilling over night at 0° C., the reaction mixture was stirred with ether and then the solid was collected on a filter and washed with ether. This residue was suspended in methyl alcohol and sulfur dioxide was bubbled into the suspension until all of the dye as the triiodide had been converted to the normal iodide. The dark brownish yellow suspension was lightened to pale yellow and much of the dye dissolved during the process. After chilling, the dye was collected on a filter. The residue was dissolved in hot methyl alcohol, decolorizing carbon was added and the mixture was heated at the refluxing temperature, and then filtered hot. The hot filtrate was treated with an excess of sodium perchlorate dissolved in hot methyl alcohol and the dye perchlorate separated on chilling. After another recrystallization from methyl alcohol the yield of colorless crystals was 28% and they had melting point 188–190° C.

Anti-kinking agent 29 used above was prepared as follows:

*Example B.—2-[2-(1-Piperidyl)vinyl]benzothiazole lauroperchlorate*

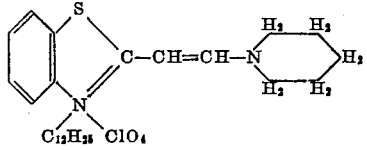

A mixture of 14.7 g. (1 mol.) of 2-β-acetanilidovinylbenzothiazole lauriodide (obtained by heating 2-methylbenzothiazole lauriodide together with diphenylformamidine and acetic anhydride) and 2.1 g. (1 mol.) of piperidine of 25 ml. of anhydrous ethyl alcohol was heated at the refluxing temperature for ten minutes. After chilling, the solid was collected on a filter and washed with acetone. A hot methyl alcoholic solution of the residue was treated with an excess of sodium perchlorate dissolved in methyl alcohol. After chilling, the product was collected on a filter and washed with methyl alcohol. The yield of product was 80% crude and 49% after two recrystallizations from methyl alcohol—including a decolorizing carbon treatment in connection with the first recrystallization. The almost colorless crystals had melting point 195–197° C.

The above examples merely illustrate the methods for preparing the anti-kinking agents of our invention, and it is to be understood that other methods can also advantageously be used.

What we claim as our invention and desire secured by Letters Patent of the United States is:

1. A light-sensitive photographic element suitable for use in X-ray photography comprising a support and a photographic silver halide emulsion on each side of the support, said emulsions containing a polymethine dye selected from those represented by the following general formula:

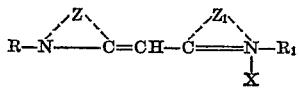

wherein R and $R_1$ each represents an alkyl group containing at least nine carbon atoms, X represents an acid radical and Z and $Z_1$ each represents the non-metallic atoms necessary to complete a heterocyclic nucleus of the benzoxazole series.

2. A light-sensitive photographic element suitable for use in X-ray photography comprising a support and a photographic silver halide emulsion on each side of the support, each of said emulsions containing 3,3'-dilauryl-oxacyanine perchlorate.

References Cited in the file of this patent

UNITED STATES PATENTS

| | | |
|---|---|---|
| 1,900,869 | Seymour | Mar. 7, 1933 |
| 1,954,346 | Capstaff | Apr. 10, 1934 |
| 2,075,191 | Gaspar | Mar. 30, 1937 |
| 2,331,492 | Michaelis | Oct. 12, 1943 |
| 2,341,877 | Middleton et al. | Feb. 15, 1944 |